United States Patent [19]
Morgan

[11] Patent Number: 5,460,459
[45] Date of Patent: Oct. 24, 1995

[54] COMPRESSION FITTINGS FOR RODS, TUBES AND PIPES

[76] Inventor: Terence Morgan, 17 Lindhurst Road, Athersley North, Barnsley, South Yorkshire S71 3DB, England

[21] Appl. No.: 80,412

[22] Filed: Jun. 21, 1993

[30] Foreign Application Priority Data

Jun. 24, 1992 [GB] United Kingdom ............... 92 13353
Oct. 3, 1992 [GB] United Kingdom ............... 92 20839

[51] Int. Cl.⁶ .................................................. F16B 2/02
[52] U.S. Cl. ....................... 403/350; 403/343; 285/318
[58] Field of Search .............................. 403/342, 343, 403/350; 285/318, 333, 390

[56] References Cited

U.S. PATENT DOCUMENTS

| | | |
|---|---|---|
| 1,996,368 | 7/1934 | Williams . |
| 2,152,681 | 4/1939 | Caminez ............................... 403/343 |
| 3,177,782 | 4/1965 | Sampson ............................... 403/343 |
| 4,708,038 | 11/1987 | Hellnick et al. ...................... 403/343 |
| 4,733,442 | 3/1988 | Asai ...................................... 403/342 |

FOREIGN PATENT DOCUMENTS

| | | |
|---|---|---|
| 570000 | 3/1988 | Australia . |
| 2235615 | 6/1973 | France . |
| 1093151 | 11/1960 | Germany . |

*Primary Examiner*—John T. Kwon
*Attorney, Agent, or Firm*—Klauber & Jackson

[57] ABSTRACT

A compression fitting comprises co-operating first and second members, a first member being in the form of a sleeve-like member or a plug-like member and having a groove therein which reduces in depth from one end of the groove to the other, and a second member adapted to be located in said groove and to be movable relative thereto and comprising a member in the form of an elongate tapered wedge formed into at least part of a helical coil, relative rotation between said first member and said wedge member enabling the compression fitting to be tightened onto a receiving member.

12 Claims, 4 Drawing Sheets

5,460,459

COMPRESSION FITTINGS FOR RODS, TUBES AND PIPES

This invention relates to compression fittings, and more particularly to compression fittings for rods, tubes and pipes.

Compression fittings for rods, tubes and pipes are in common use, but presently used compression fittings are generally dependent upon the rod, tube or pipe having an external or internal thread to which the fitting is attached, and this limits the position of such a fitting.

There are fittings which are not restricted by this problem—the Jubilee clip is a prime example—but such fittings invariably involve the use of a screwdriver or other tool in order to tighten and loosen the fitting, and the range of diameters that can be accommodated is very limited.

Fittings which can be hand tightened are also known, but are restricted in their use because of their awkward shape and size.

The present invention seeks to provide an improved form of compression fitting which will obviate the above-described drawbacks and disadvantages of presently known compression fittings.

According to the present invention there is provided a compression fitting comprising a first member having a surface formed as a surface of a solid of rotation about an axis of said member and having a groove therein which reduces in depth from one end of the groove to the other, and a second member formed to fit in said groove and to be movable relative thereto and comprising an elongate tapered wedge member formed into a helical coil, said first member and said wedge member, when located relative to a receiving member, being relatively movable such that the compression fitting grips said receiving member.

Preferably said surface will be the surface of a cylinder, and will be formed as an internal or an external surface.

Preferably, said groove will be of constant width, and of variable pitch and taper, and the groove will preferably extend through at least one complete turn.

Said tapered wedge member may extend over only part of a complete turn or at least one or more complete turns, and said wedge member will preferably be resilient.

In order that the invention may be more readily understood embodiments thereof will now be described, by way of example only, reference being made to the accompanying drawings, wherein.

Figure 1:
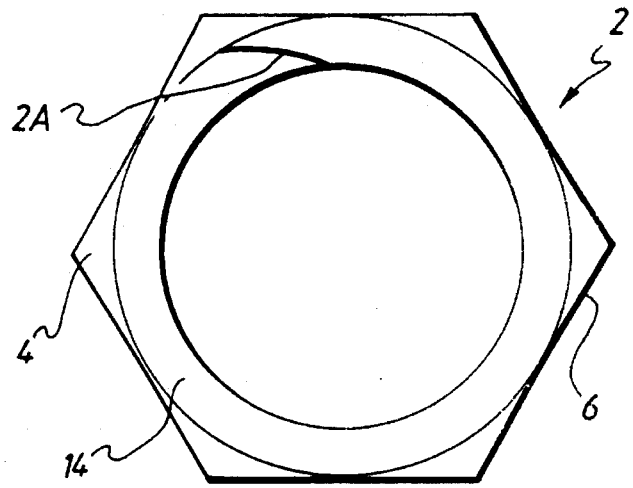
FIG. 1 is an end view of a first part of a compression fitting in accordance with the invention.
Figure 2:
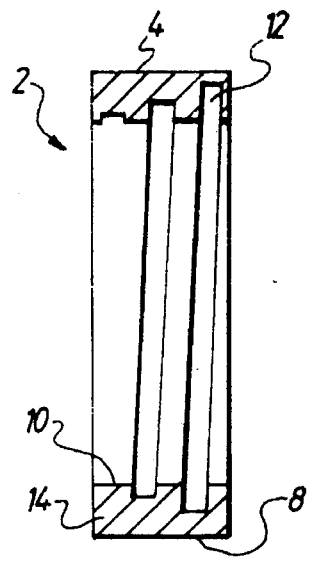
FIG. 2 is a sectional side elevation on FIG. 1.

Referring to the drawings and firstly to FIGS. 1 to 4, FIGS. 1 and 2 show a first member 2 of a compression fitting, the member 2 being in the form of a sleeve 4 having an hexagonal end 6 for engagement, if appropriate, by a spanner or other tool (not shown) in order to rotate the member 2.

The member 2 has a cylindrical outer surface 8 and an inner cylindrical surface 10, said inner cylindrical surface having therein a helical groove 12 which is of rectangular cross-section and of constant width. The helical groove 12 varies in depth from one end of the groove to the other, the groove being deepest adjacent the hexagonal end 6 of the member 2 and becoming gradually shallower, in the course of the turns of the groove, until it is shallowest at the opposite flat end 14 of the member 2.

Figure 3:
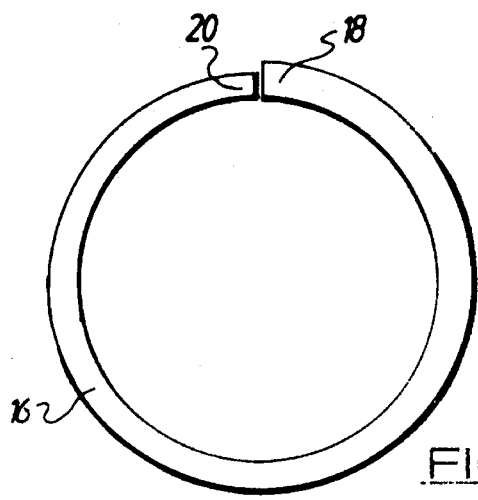
FIG. 3 is an end view of a second part of the compression fitting.
Figure 4:
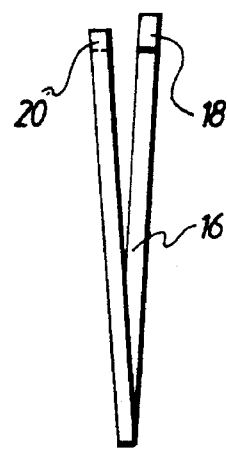
FIG. 4 is a side view on FIG. 3.

FIGS. 3 and 4 show a helical wedge member 16 which is of constant width but of reducing depth from one end of the wedge member to the other. As will be seen, the wedge member 16 is deepest at end 18 thereof and tapers gradually towards and is shallowest at the opposite end thereof. The width of the helical wedge member 16 is such that it will be readily accommodated in the groove 12 in the member 2, and the helical wedge member extends over virtually one complete turn as shown in FIG. 3.

Figure 5:
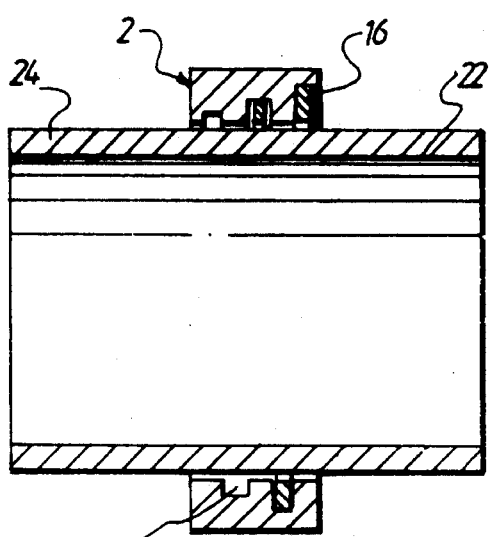
FIG. 5 is a cross-sectional elevation of the first and second parts of FIGS. 1 to 4 in co-operating and untightened relationship on a length of pipe or tube.
Figure 6:
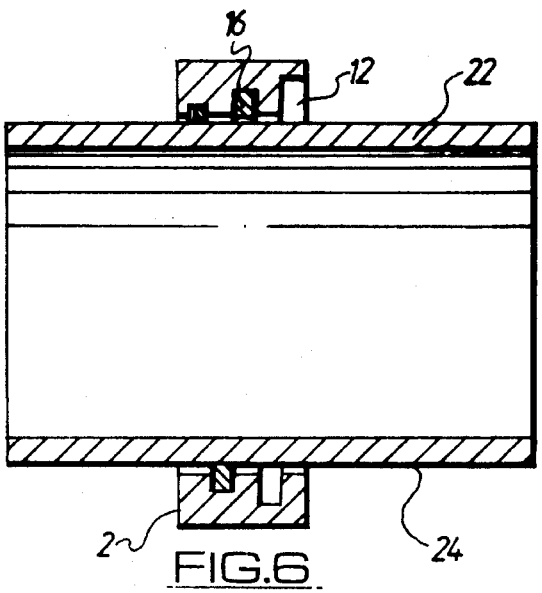
FIG. 6 is a view similar to FIG. 5 but showing the parts in a tightened relationship on said pipe or tube.
Figure 7:
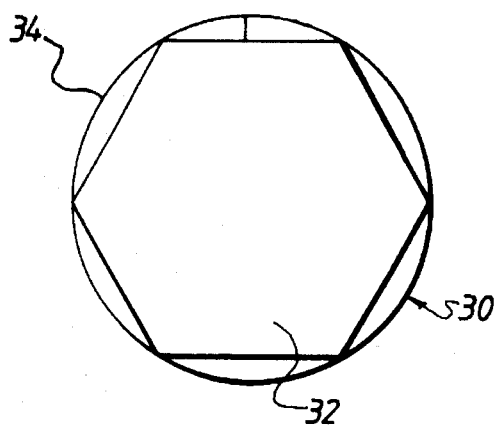
FIG. 7 is an end view of a first part of an alternative form of compression fitting in accordance with the invention.
Figure 8:
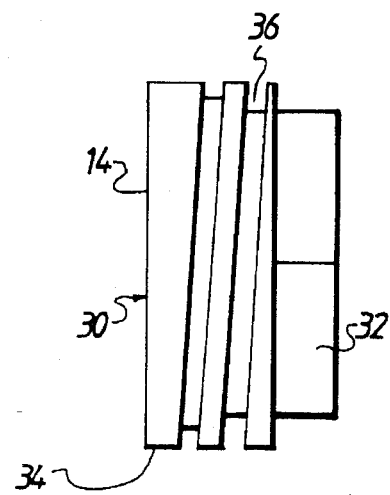
FIG. 8 is a side elevation on FIG. 7.

Referring now to FIGS. 5 and 6, the member 2 and wedge member 16 are shown in co-operating relationship with each other and with a pipe or tube 22. It will be seen that the wedge member 16 is located in the groove 12 of the member 2—having been inserted via an opening 2A in member 2. FIG. 5 illustrates the compression fitting in its loose, untightened position. If the assembled compression fitting is then turned by hand, or by means of a spanner or other tool engaging the hexagonal end 6 of the member 2, or if the pipe or tube is rotated relative to the fitting, then friction forces the wedge member 16 around the tapering groove of the member 2 and, because the internal diameter of the wedge member 16 is constantly being reduced by this action, compression is applied to the surface of the pipe or tube 22. This is shown in FIG. 6 where it is seen that the wedge member 16 in addition to being in contact with the bottom of the groove 12 is also in contact with the outer surface 24 of the pipe or tube 22.

Turning now to FIGS. 7 to 10, FIGS. 7 and 8 show a first member 30 of a compression fitting which is in the form of a short cylindrical plug. The member 30 has a hexagonal end 32 for engagement, if appropriate, by a spanner or other tool (not shown) in order to rotate the compression fitting as will be hereinafter explained. The member 30 has a cylindrical outer surface 34 in which is cut a helical groove 36 of rectangular cross-section and constant width. The groove is of varying depth, and is deepest adjacent the hexagonal end 32 of the member 30 and becomes gradually shallower until it is shallowest at the opposite flat end 38 of the member 30. This is clearly shown in FIG. 8.

Figure 9:
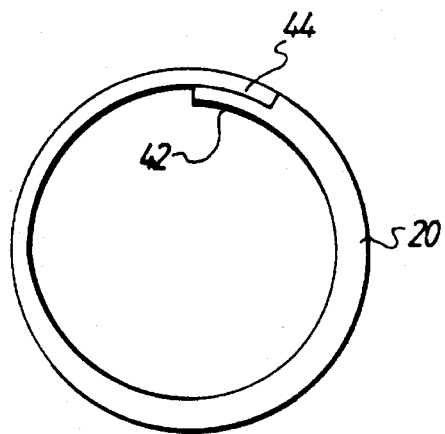
FIG. 9 is an end view of a second part of the alternative form of compression fitting.
Figure 10:
FIG. 10 is a side view on FIG. 9.

FIGS. 9 and 10 illustrate a wedge member 40 which in all material respects is the same as the wedge member 16 previously described with reference to FIGS. 3 and 4. As with the wedge member 16, the wedge member 40 tapers gradually in depth from one end to the other end and is deepest towards one end 42 of the member 40 and shallowest at its opposite end 44. In this case, however, the wedge member 40 extends over rather more than one complete helical turn, as shown in FIG. 9.

Figure 11:
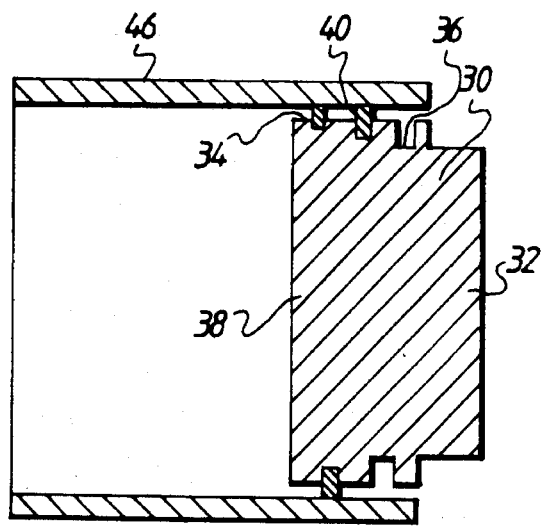
FIG. 11 is a cross-sectional elevation of the first and second parts of FIGS. 7 to 10 in co-operating and untightened relationship relative to a length of pipe or tube.
Figure 12:
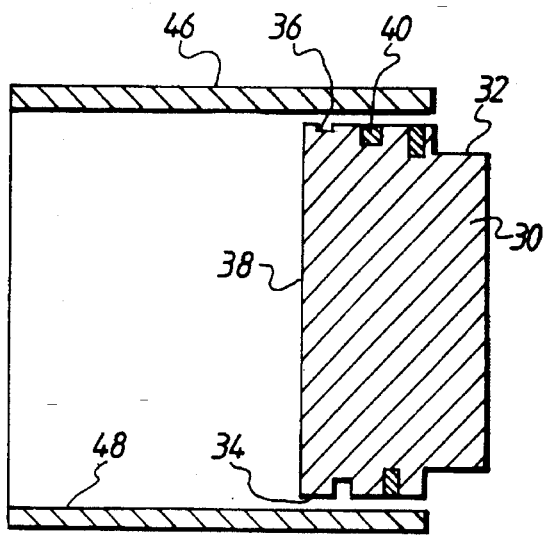
FIG. 12 is a view similar to FIG. 11 but showing the parts in a tightened relationship on said pipe or tube.

FIGS. 11 and 12 show the member 30 and wedge member 40 inserted into the end of a pipe or tube 46. In FIG. 12, the wedge member 40 is located in the deepest part of the groove 36 such that it does not protrude therefrom, and the member 30 can be freely slid into the end of the pipe or tube 46. Once the member 30 and wedge member 40 have been inserted, the member 30 is turned using a tool in engagement with the hexagonal end 32—or by hand—and this rotation causes the wedge member 40 to travel along the groove 36 so as to force the wedge member 40 radially outwards until the position is reached as shown in FIG. 11, wherein the wedge member 40 is in tight engagement against both the floor of the groove 36 and the inner surface of the pipe or tube 46.

Thus, it will be appreciated that the arrangement shown in FIGS. 11 and 12 is the same in principle, although different in geometry, to the arrangement shown and described with reference to FIGS. 5 and 6.

The pitch and taper of the groove of the members 2 and 30 is variable, and the wedge members 16 and 40 may be selected to be longer or shorter, i.e. the wedge members may extend over only a part of a complete turn or it may extend over many complete turns. In general, a steep taper with a short-wedge will allow a quick wedging action, suitable for connections which may be used repeatedly, whilst a shallow taper and a long wedge member, extending over several turns, will produce a firmer wedging action suitable for structures intended to be taken apart rarely, and suitable for applications where a fluid seal is to be built in, such as in pipeline connections, for example.

The members and wedge members may be fabricated in any suitable materials, for example in metal or in plastics materials, depending upon the intended applications. The wedge members may be formed of a relatively hard material, for example metal, for use in conjunction with the members of plastics material, in order to 'bite' into the surfaces of said members, or they may be formed of a relatively soft material to provide a grip and seal, and may be of rubber or any other material such as is used to make sealing rings, including sintered metals.

For use in connecting high pressure pipes or hoses, conventional sealing rings should also be used, as fluid will tend to creep along the helical groove, and escape around the wedge member.

Possible examples of application of fittings in accordance with the invention are:

in a multi-locking system for shutters or grills;

in pipe compression fittings;

in connections for garden hoses;

in tamper proof closures for bottles and containers;

in capping devices to stop end pipes; and in permanent fastening tools, oil filter removers, screw cap removers, nut removers, beer tap nozzles, optic holders, and threadless bolts, all being provided with the fitting in the external member.

Further examples, with the fitting provided on the internal member, are:

in wall fixings, from wall plugs to expanding bolts for use in concrete;

in a shotgun barrel lock;

in a bottle or container stopper; and in a friction lock.

Figure 13:
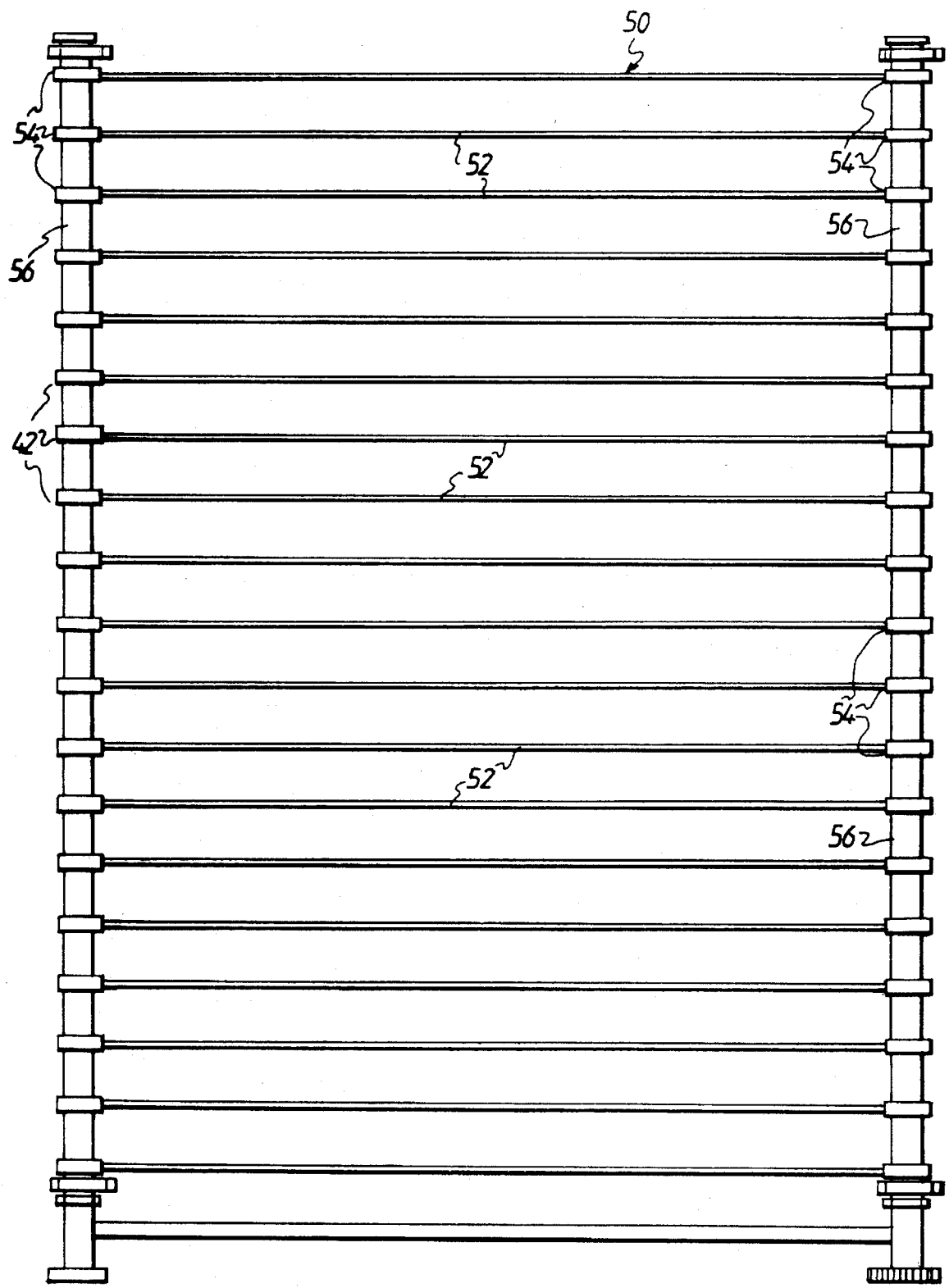
FIG. 13 is a general view of a security shutter or grill incorporating and making use of the invention.
Figure 15:
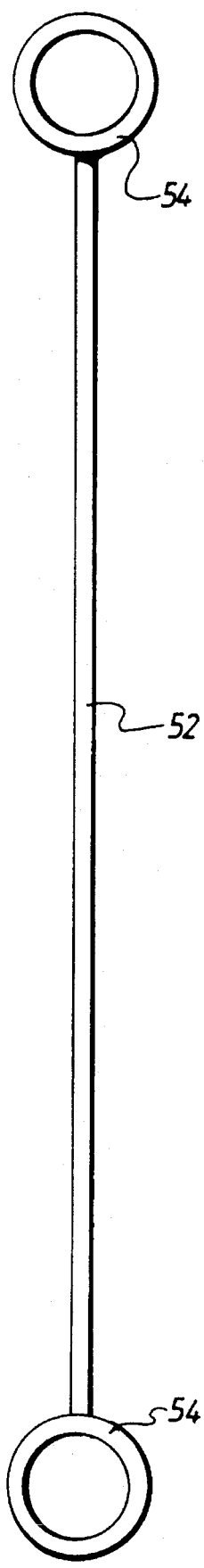
FIG. 15 is a side view on FIG. 14.
Figure 14:
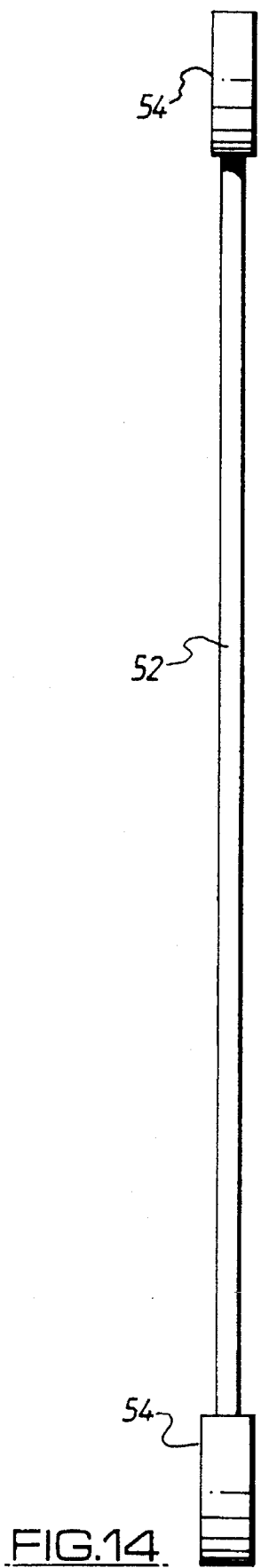
FIG. 14 is a front view of one of the bars making up the shutter or grill of FIG. 13.

An example of one possible use for compression fittings in accordance with the invention is shown in FIGS. 13 to 15 which illustrate such use in connection with a security shutter or grill 50. The shutter or grill 50 comprises a plurality of bars 52 each mounted at each end by means of an annular collar 54 on a respective side rod 56. The collars 54 each incorporate a compression fitting in accordance with the invention—more specifically in accordance with FIGS. 7 to 12—and the fittings are slackened and tightened by rotation of the respective side rod 56 in one direction or the other. When the fittings are slackened, the bars 54 may be slid along the rods 56—to open the shutter or grill by sliding the bars to one end, or to close the shutter or grill by sliding the bars to their spaced locations shown. Such spaced locations may for example be defined by cross levers between each pair of bars, or chains which define the spacing by their maximum extent.

When this has been done, the collars incorporating the compression fittings in accordance with the invention can be tightened by appropriate rotation of the side rods 56 which will be provided with a protective structure and which will only be releasable to facilitate its rotation by a unique key. The ends of the side rods 56 may be protected by a padlocked cover.

Another possible use for a compression fitting in accordance with the invention is in a jack with either a left-hand thread or a right-hand thread, in which the pitch of the groove and the wedge member will determine the amount of lift and fall of the jack.

In connection with the embodiment of FIGS. 7 to 12, the plug may be adapted to tighten back onto a shoulder formed in the bore of the pipe or tube, although this is not essential for the successful operation of the fitting.

Thus the invention provides a compression fitting which is easily and conveniently operated, and which may be an internal or an external fitting.

It will be appreciated that, if desired, the groove in the first members may be of tapering width, and that the wedge members would be formed accordingly, i.e. the wedge members would be tapered width-wise from one end to the other, as well as being of lessening depth from one end to the other.

I claim:

1. A compression fitting comprising a first member having a surface formed as a surface of a solid of rotation about an axis of said member and having a groove therein which reduces in depth from one end of the groove to the other, and a second member formed to fit in said groove and to be movable relative thereto and comprising an elongate tapered wedge member formed into at least part of a helical coil, said first member and said wedge member, when located relative to a receiving member, being relatively movable so as to enable the compression fitting to be tightened against said receiving member.

2. A compression fitting according to claim 1, wherein said surface is the surface of a cylinder.

3. A compression fitting according to claim 1, wherein said surface is formed as an external surface.

4. A compression fitting according to claim 1, wherein said surface is formed as an internal surface.

5. A compression fitting according to claim 1, wherein said groove is of constant width.

6. A compression fitting according to claim 5, wherein said groove extends through at least one complete turn.

7. A compression fitting according to claim 1, wherein said wedge member is resilient.

8. A compression fitting according to claim 1, wherein said wedge member is of constant width and reduces in depth from one end thereof to the other.

9. A compression fitting according to claim 8, wherein said wedge member extends over at least part of a helical turn.

10. A compression fitting according to claim 8, wherein said wedge member extends over at least one complete helical turn.

11. A compression fitting comprising in combination a sleeve-like member having an inner surface formed as a surface of a solid of rotation about an axis of said member and having a helical groove therein which reduces in depth from one end of the groove to the other and which extends through one or more complete turns, and a resilient second member adapted to be located in said groove and to be movable relative thereto and comprising a member in the form of an elongate tapered wedge formed into at least part of a helical coil, relative rotation between said sleeve-like member and said wedge member enabling the compression fitting to be tightened against a receiving member.

12. A compression fitting comprising in combination a plug-like member having an outer surface formed as a surface of a solid of rotation about an axis of said member and having a helical groove therein which reduces in depth from one end of the groove to the other and which extends through one or more complete turns, and a resilient second member adapted to be located in said groove and to be movable relative thereto and comprising a member in the form of an elongate tapered wedge formed into at least part of a helical coil, relative rotation between said plug-like member and said wedge member enabling the compression fitting to be tightened against a receiving member.

\* \* \* \* \*